(12) United States Patent
Shimazaki et al.

(10) Patent No.: US 11,432,005 B2
(45) Date of Patent: Aug. 30, 2022

(54) MOVING IMAGE ENCODING DEVICE (71) Applicants: NTT Electronics Corporation, Yokohama (JP); NIPPON TELEGRAPH AND TELEPHONE CORPORATION, Tokyo (JP)

(72) Inventors: Akiko Shimazaki, Kanagawa (JP); Ken Nakamura, Kanagawa (JP); Takayuki Onishi, Kanagawa (JP); Takashi Sano, Kanagawa (JP)

(73) Assignees: NTT ELECTRONICS CORPORATION, Yokohama (JP); NIPPON TELEGRAPH AND TELEPHONE CORPORATION, Tokyo (JP)

( * ) Notice: Subject to any disclaimer, the term of this patent is extended or adjusted under 35 U.S.C. 154(b) by 125 days.

(21) Appl. No.: 16/452,025

(22) Filed: Jun. 25, 2019

(65) Prior Publication Data
US 2019/0320201 A1 Oct. 17, 2019

Related U.S. Application Data (62) Division of application No. 15/548,673, filed as application No. PCT/JP2016/056641 on Mar. 3, 2016, now abandoned.

(30) Foreign Application Priority Data

Mar. 25, 2015 (JP) .............................. JP2015-062905

(51) Int. Cl.
H04N 19/00 (2014.01)
H04N 19/593 (2014.01)
(Continued)

(52) U.S. Cl.
CPC ......... *H04N 19/593* (2014.11); *H04N 19/107* (2014.11); *H04N 19/11* (2014.11);
(Continued)

(58) Field of Classification Search
CPC .... H04N 19/593; H04N 19/107; H04N 19/11; H04N 19/126; H04N 19/14;
(Continued)

(56) References Cited

U.S. PATENT DOCUMENTS 8,036,270 B2 * 10/2011 Zhao ..................... H04N 19/172
375/240.15
8,036,279 B2 * 10/2011 Isu .......................... H04N 7/52
375/240.25
(Continued)

FOREIGN PATENT DOCUMENTS

EP 2 081 386 A1 7/2009
JP 2006115487 A 4/2006
(Continued)

OTHER PUBLICATIONS

Office Action dated Jul. 4, 2019 of corresponding European Patent Application No. 16768349.9.
(Continued)

*Primary Examiner* — Frank F Huang
(74) *Attorney, Agent, or Firm* — ArentFox Schiff LLP (57) ABSTRACT

A computation unit subtracts a prediction image from an input image. An orthogonal transformation unit applies orthogonal transformation to an output of the computation unit. A quantization unit quantizes an output of the orthogonal transformation unit. An encoding unit encodes an output of the quantization unit. A prediction mode determination unit determines a prediction mode from the input image. The prediction mode is different according to types of an I-picture, a P-picture and a B-picture.

4 Claims, 8 Drawing Sheets

(51) Int. Cl.

| | |
|---|---|
| *H04N 19/176* | (2014.01) |
| *H04N 19/159* | (2014.01) |
| *H04N 19/14* | (2014.01) |
| *H04N 19/107* | (2014.01) |
| *H04N 19/11* | (2014.01) |
| *H04N 19/126* | (2014.01) |
| *H04N 19/182* | (2014.01) |
| *H04N 19/61* | (2014.01) |
| *H04N 19/625* | (2014.01) |

(52) U.S. Cl.
CPC ........... *H04N 19/126* (2014.11); *H04N 19/14* (2014.11); *H04N 19/159* (2014.11); *H04N 19/176* (2014.11); *H04N 19/182* (2014.11); *H04N 19/61* (2014.11); *H04N 19/625* (2014.11)

(58) Field of Classification Search
CPC .... H04N 19/159; H04N 19/182; H04N 19/61; H04N 19/625
See application file for complete search history.

(56) References Cited

U.S. PATENT DOCUMENTS

| | | | | |
|---|---|---|---|---|
| 10,057,595 | B2* | 8/2018 | Kadono | H04N 19/56 |
| 2003/0045373 | A1* | 3/2003 | Field | A63B 53/02 |
| | | | | 473/340 |
| 2007/0019729 | A1* | 1/2007 | Nakagomi | H04N 19/192 |
| | | | | 375/240.13 |
| 2009/0011007 | A1 | 1/2009 | Meier et al. | |
| 2009/0097555 | A1* | 4/2009 | Baillavoine | H04N 19/46 |
| | | | | 375/240.12 |
| 2009/0110070 | A1* | 4/2009 | Takahashi | H04N 19/60 |
| | | | | 375/240.12 |
| 2009/0190660 | A1 | 7/2009 | Kusakabe | |
| 2009/0290643 | A1* | 11/2009 | Yang | H04N 19/593 |
| | | | | 375/240.16 |
| 2010/0266042 | A1* | 10/2010 | Koo | H04N 19/70 |
| | | | | 375/240.16 |
| 2011/0002385 | A1* | 1/2011 | Kobayashi | H04N 19/61 |
| | | | | 375/240.13 |
| 2011/0007799 | A1 | 1/2011 | Karczewicz et al. | |
| 2012/0327999 | A1* | 12/2012 | Francois | H04N 19/11 |
| | | | | 375/240.02 |
| 2013/0229485 | A1* | 9/2013 | Rusanovskyy | H04N 19/52 |
| | | | | 348/43 |
| 2014/0092979 | A1 | 4/2014 | Sato | |
| 2015/0312545 | A1* | 10/2015 | Xu | H04N 13/161 |
| | | | | 348/43 |
| 2016/0105682 | A1* | 4/2016 | Rapaka | H04N 19/593 |
| | | | | 375/240.12 |
| 2018/0020233 | A1* | 1/2018 | Shimazaki | H04N 19/61 |

FOREIGN PATENT DOCUMENTS

| | | |
|---|---|---|
| JP | 2007-228519 A | 9/2007 |
| JP | 2007-251996 A | 9/2007 |
| JP | 2009-111691 A | 5/2009 |
| JP | 2010-283739 A | 12/2010 |
| JP | 2012-244353 A | 12/2012 |
| JP | 2013-138502 A | 7/2013 |
| JP | 2014082639 A | 5/2014 |

OTHER PUBLICATIONS

Summons to Attend Oral Proceedings Pursuant to Rule 115(1) EPC, issued by the European Patent Office in corresponding European Patent Application No. 16768349.9, dated Feb. 25, 2020.
Extended European Search Report of European Patent Application No. 16768349.9 dated Sep. 18, 2018.
International Search report of related International Patent Application No. PCT/JP2016/056641 dated May 10, 2016.
Japanese Office Action of related Japanese Patent Application No. 2015-062905 dated Apr. 19, 2016.
Japanese Office Action of related Japanese Patent Application No. 2015-062905 dated Jul. 5, 2016.
Written Opinion of related International Patent Application No. PCT/JP2016/056641 dated Oct. 5, 2017.
Office Action issued by the the Brazilian Patent Office in corresponding Brazilian Patent Application No. BR112017017282-8, dated Jan. 23, 2020.

* cited by examiner

MOVING IMAGE ENCODING DEVICE

CROSS-REFERENCE TO RELATED APPLICATIONS

This application is a Divisional of U.S. patent application Ser. No. 15/548,673, filed Aug. 3, 2017, which is a National Stage Entry of International Patent Application No. PCT/JP2016/056641, filed on Mar. 3, 2016, which claims priority to Japanese Patent Application No. 2015-062905, filed on Mar. 25, 2015. The disclosures of the priority applications are incorporated in their entirety herein by reference.

FIELD

The present invention relates to a moving image encoding device that encodes a moving image.

BACKGROUND

Intrinsically, encoding is to determine the intra-prediction mode using a local decoded image, and to generate a prediction image using the local decoded image. However, this impairs the advantageous effect of improvement in speed in a case where the speed of the moving image encoding device is intended be improved through parallel processing. Accordingly, intra-prediction mode determination often uses an input image.

Unfortunately, since final predicted image generation necessarily uses the local decoded image, a possible difference between the input image and the local decoded image causes a problem in that generation of the prediction image from the local decoded image cannot allow the optimal intra-prediction mode to be selected. In particular, in a case where there is a difference between the input image and the local decoded image in an area with flat pixel values, such as a black border of a windowboxed image, an appropriate prediction error cannot be calculated, an intra-prediction mode having a large error is selected, and image degradation becomes visually prominent. Images similar to window-boxed images include a title image which has flat pixel values over the entire image and in which characters are partially written.

CITATION LIST

Patent Literature

[PTL 1] JP 2010-283739 A
[PTL 2] JP 2012-244353 A

SUMMARY

Technical Problem

In PTL 1, an intra-prediction is performed using an input image. In a case where the difference between the input image and the local decoded image is large, the mode is forcibly changed to a DC mode. Unfortunately, the DC mode creates a prediction image using the average of adjacent pixel data items; although image degradation can be suppressed, the advantageous effect of improving the image quality is insufficient. In case of incapability of calculating the difference between the input image and the local decoded image, the technology of PTL 1 cannot be adopted.

PTL 2 describes a method of reducing degradation in image quality during fading. This method switches weighted prediction on and off through control on an area-by-area basis. In the windowboxed area, this prediction is turned off. Unfortunately, the technology of PTL 2 is inapplicable to normal video without fading.

The present invention has been made to solve the problems described above, and has an object to obtain a moving image encoding device that can improve the image quality of video including a motionless area with flat pixel values, such as in windowboxing.

Solution to Problem

A moving image encoding device according to the present invention includes: a computation unit subtracting a prediction image from an input image; an orthogonal transformation unit applying orthogonal transformation to an output of the computation unit; a quantization unit quantizing an output of the orthogonal transformation unit; an encoding unit encoding an output of the quantization unit; and a prediction mode determination unit determining a prediction mode from the input image, wherein the prediction mode is different according to types of an I-picture, a P-picture and a B-picture.

Advantageous Effects of Invention

The present invention makes it possible to improve the image quality of video including a motionless area with flat pixel values, such as in windowboxing.

DESCRIPTION OF EMBODIMENTS

Figure 1:
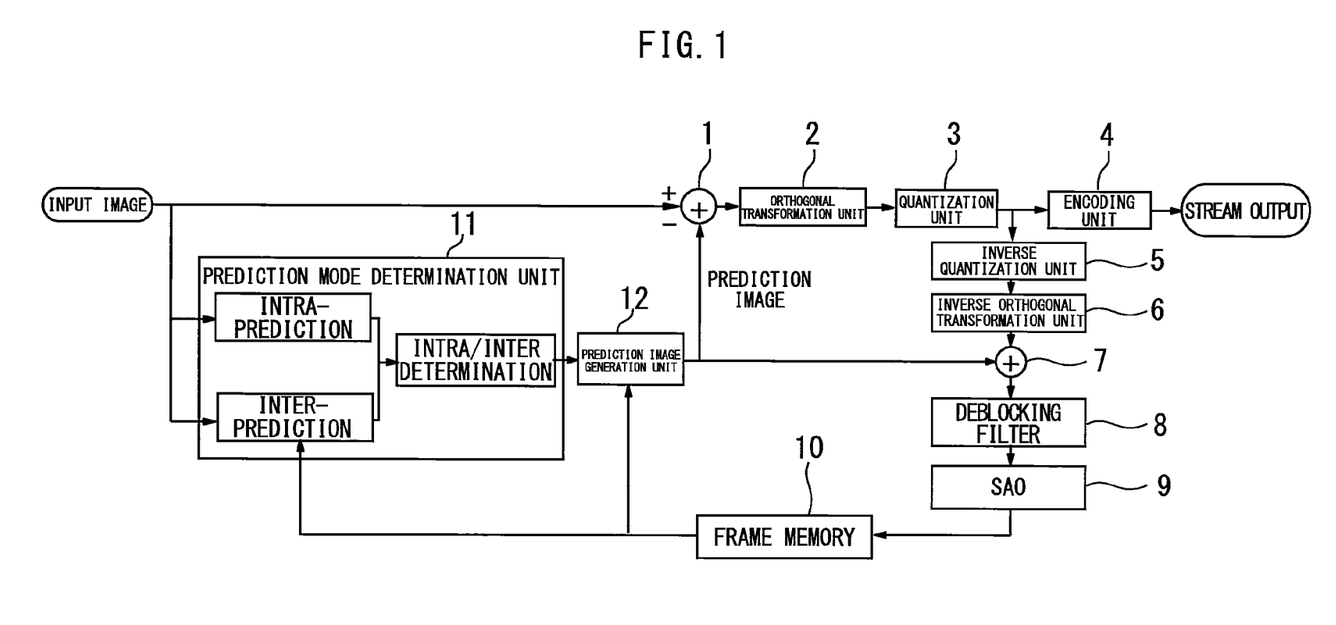
FIG. 1 is a diagram showing a moving image encoding device according to an embodiment of present invention.

FIG. 1 is a diagram showing a moving image encoding device according to an embodiment of present invention. A computation unit 1 subtracts a prediction image from an input image. An orthogonal transformation unit 2 applies orthogonal transformation, such as discrete cosine transform or Karhunen-Loève transform, to an output of the computation unit 1. Note that any method of orthogonal transformation may be adopted. A quantization unit 3 quantizes the output of the orthogonal transformation unit 2. Any quantization method may be adopted. An encoding unit 4 encodes the output of the quantization unit 3 and generates a stream output.

An inverse quantization unit 5 inverse-quantizes the output of the quantization unit 3. Note that any inverse quantization method may be adopted only if the method supports the quantization process in the quantization unit 3. An inverse orthogonal transformation unit 6 applies inverse orthogonal transformation to the output of the inverse quantization unit 5. Note that any inverse orthogonal transformation method may be adopted only if the method supports the orthogonal transformation process in the orthogonal transformation unit 2. A computation unit 7 adds the prediction image to the output of the inverse quantization unit 5, and obtains a local reconstructed image. The reconstructed image is subjected to a filter process through a deblocking filter 8 and a SAO (Sample Adaptive Offset) 9, and is subsequently stored in a frame memory 10.

A prediction mode determination unit 11 determines the prediction mode from the input image. The prediction mode is different according to types of an I-picture, a P-picture and a B-picture. More specifically, the I-picture is a picture to be subjected only to intra-prediction. Accordingly, only the intra-prediction is performed to determine the prediction mode. In a case where the P-picture or B-picture, intra-prediction and inter-prediction are performed, and the intra-prediction mode and the inter-prediction mode are determined. Next, intra/inter determination that selects any one of the determined intra-prediction mode and inter-prediction mode to thus determine the prediction mode.

The intra-prediction mode performs determination through intra-prediction using the pixel values of the image in a surrounding area positioned around a coding target block. The inter-prediction mode performs determination through inter-prediction using the input image and a reference image supplied from the frame memory 10.

A prediction image generation unit 12 generates a prediction image using the mode determined by the prediction mode determination unit 11 and the reference image supplied from the frame memory 10.

To obtain the characteristics of an image, such as of windowboxing, the amount of characteristic that can be calculated from information on the input image is used. The amount of characteristic may be information on a pixel value, such as the luminance or chrominance, and can be obtained in the unit of CU (Coding Unit) or picture. In this embodiment, a flat area determination parameter is used to determine a motionless area that has flat pixel values and characterizes windowboxing. Examples of flat area determination parameters include the activity, and the sum of absolute differences between adjacent pixels. The activity is a parameter that represents the degree of distribution of the pixel values of the input image, and is the amount of characteristic that is important in measurement of the complexity of video. The sum of absolute differences between adjacent pixels is a parameter that represents the relationship with adjacent pixels, and is the amount of characteristic for measuring the similarities and differences of the adjacent pixels.

The activity can be obtained by Math. 1.

$$\text{activity} = \sum_{i=0}^{n} |X_i - \overline{X}| \qquad \text{Math. 1}$$

Here, n is the block size, X is the pixel value, X (–) is the average value of the pixel values X in the block size. Note that any block size for obtaining the activity may be adopted. The sum of absolute differences between adjacent pixels can be obtained by Math. 2.

$$\text{sad} = \sum_{i=0}^{n} |X - Y| \qquad \text{Math. 2}$$

Here, n is the block size, and X and Y represent the pixel values of adjacent pixels. Note that any block size for obtaining the sum of absolute differences between adjacent pixels may be adopted.

For the I-picture, the offset value is obtained on the basis of the flat area determination parameter, and the intra-prediction is executed on the basis of the evaluation value to which the offset value has been added. For the P-picture and B-picture, the offset value is obtained on the basis of the flat area determination parameter, any one of the intra-prediction mode and the inter-prediction mode is selected on the basis of the evaluation value to which the offset value has been added, and the selected mode is applied to each block of the input image. Such addition of the offset value obtained from the flat area determination parameter to the evaluation value to be used for mode determination can improve the image quality of video that includes a motionless area having flat pixel values, such as of windowboxing.

Figure 2:
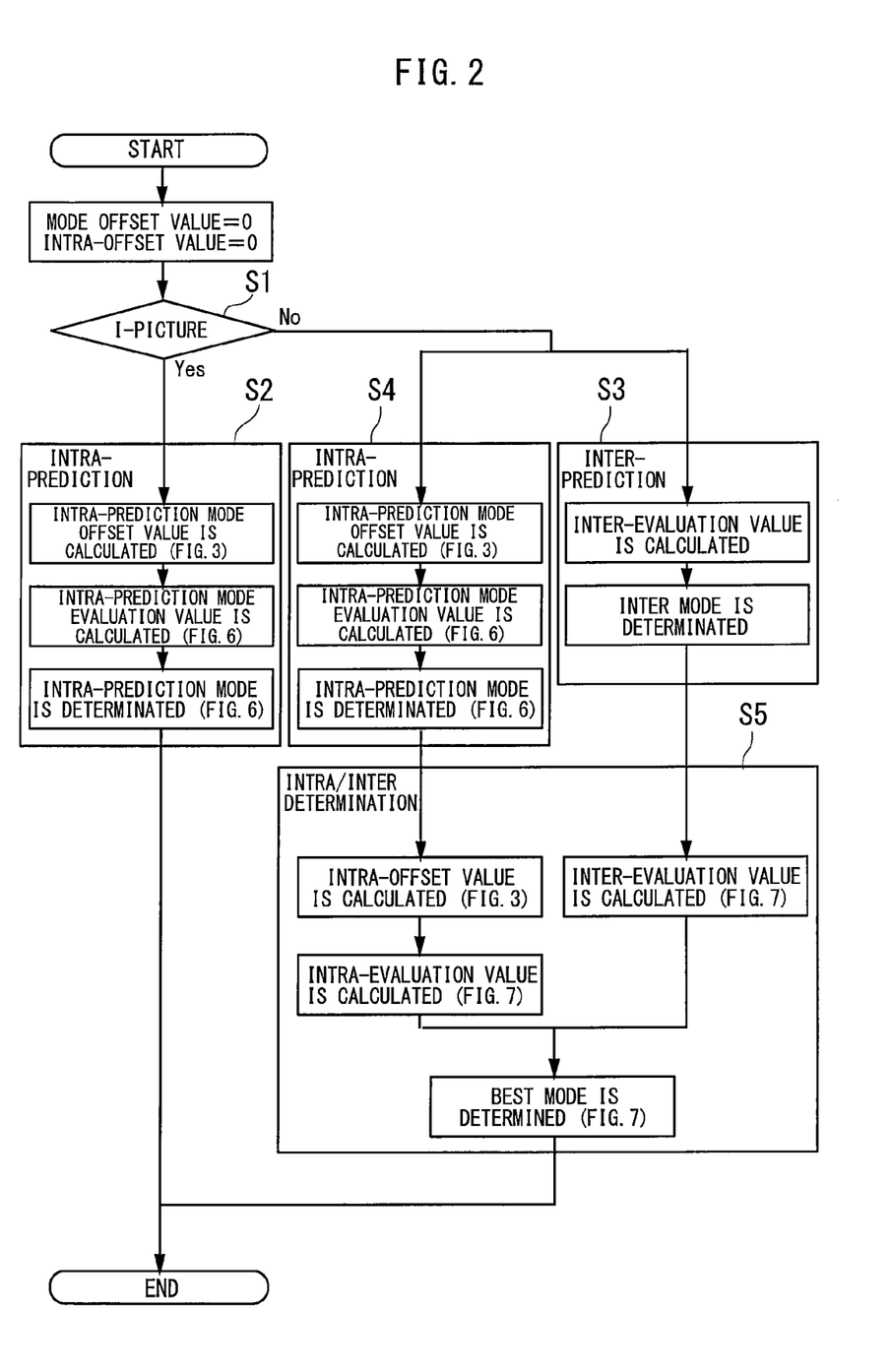
FIG. 2 is a diagram showing a processing flow in the prediction mode determination unit.

FIG. 2 is a diagram showing a processing flow in the prediction mode determination unit. First, the mode offset value and the intra-offset value are set to zero. Next, it is determined whether the coding target picture is the I-picture or not (step S1). When the coding target picture is the I-picture, the intra-prediction is performed that determines one mode among 35 intra-prediction modes using the intra-prediction mode evaluation value (step S2). The intra-prediction mode evaluation value is a value obtained by adding the intra-prediction mode offset value to an existing evaluation value. The intra-prediction mode offset value is a value determined by the flat area determination parameter.

When the picture is other than the I-picture (P-picture or B-picture), the inter-prediction is performed that detects a motion vector from the reference image and determines the optimal motion vector (step S3). As with the case of I-picture, the intra-prediction is performed (step S4). Thus, the one optimal inter-mode and the one optimal intra-mode are determined.

Next, the intra/inter determination is performed that determines the best mode from the determined optimal inter-mode using the inter-evaluation value and optimal intra-mode using the intra-evaluation value (step S5). Note that in the present invention, improvement in intra-prediction (steps S2 and S4) and improvement in intra/inter determination (step S5) can be independently configured. More specifically, the case where only the intra-prediction is intended to be enabled can be achieved by not invoking the offset value calculation block in step S5; the case where only the intra/inter determination is intended to be enabled can be achieved by not invoking the offset value calculation blocks in steps S2 and S4.

The windowboxed area is an area determined to be flat on the basis of the flat area determination parameter. Consequently, it is required that the intra-prediction direction from the block determined to be nonflat should not be selected. The determination of the intra-prediction mode and the intra/inter determination select the mode with the lowest evaluation value. Consequently, increase in the evaluation value can make the mode resistant to being selected. Thus, the evaluation value is calculated on a mode-by-mode basis, and the offset value is added to the evaluation value to correct the evaluation value. The offset value is determined from the magnitude relationship between the flat area determination parameter of the adjacent block to be used for prediction and the set threshold. For example, the offset value is stepwise changed by setting multiple thresholds and by configuring setting so that the larger the flat area determination parameter of the adjacent block is, the larger the offset is set.

Figure 3:
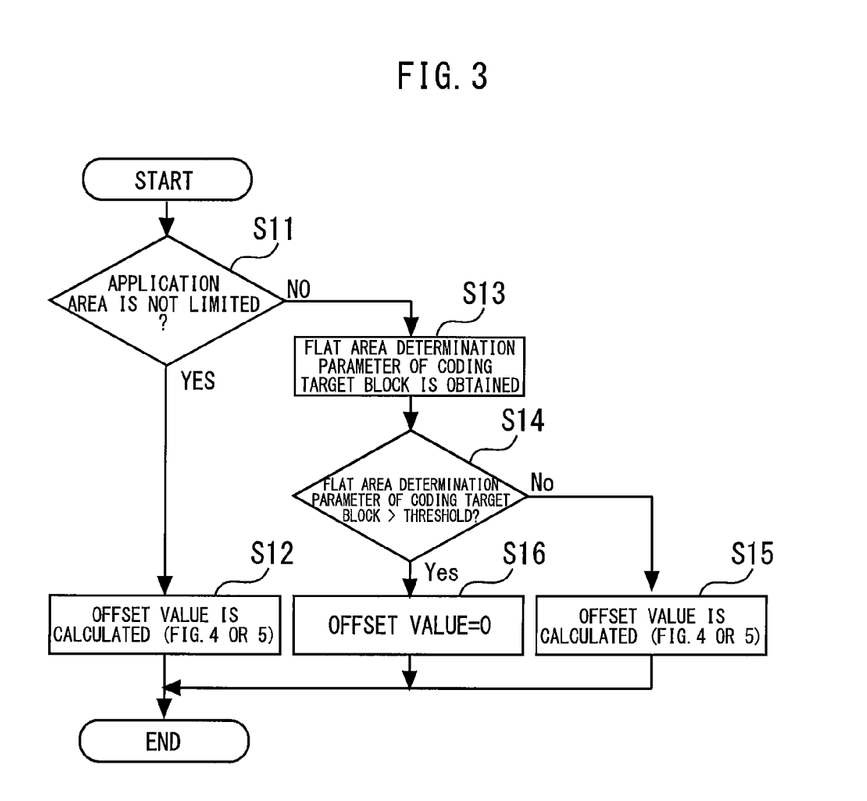
FIG. 3 is a diagram showing an offset value calculation flow.

FIG. 3 is a diagram showing an offset value calculation flow. First, it is determined whether the application area is limited or not (step S11). In a case where the application area is not specifically limited, the evaluation value to which the offset value has been added is used for every block (step S12). In the offset value calculation (step S12), the intra-prediction mode offset value used during intra-prediction is calculated using the flow of FIG. 4, and the intra-offset value used during intra/inter determination is calculated using the flow of FIG. 5.

In a case where the application area is limited, the flat area determination parameter of the coding target block is obtained (step S13). It is determined whether the flat area determination parameter of the coding target block is at least the designated threshold or not (step S14). When the flat area determination parameter is lower than the threshold, the evaluation value to which the offset value has been added is used (step S15). In the offset value calculation (step S15), the intra-prediction mode offset value used during intra-prediction is calculated using the flow of FIG. 4, and the intra-offset value used during intra/inter determination is calculated using the flow of FIG. 5.

In the block where the flat area determination parameter is at least the threshold, the pixel values largely vary and are not constant, such as of a black border. Thus, when the flat area determination parameter is at least the threshold, zero is substituted into the offset value, and this function is not applied (step S16). Typically, since areas with nonflat pixel values are the majority, zero is substituted into the offset value according to the flat area determination parameter to limit the application range, thereby preventing the area with nonflat pixel values from being affected.

Figure 4:
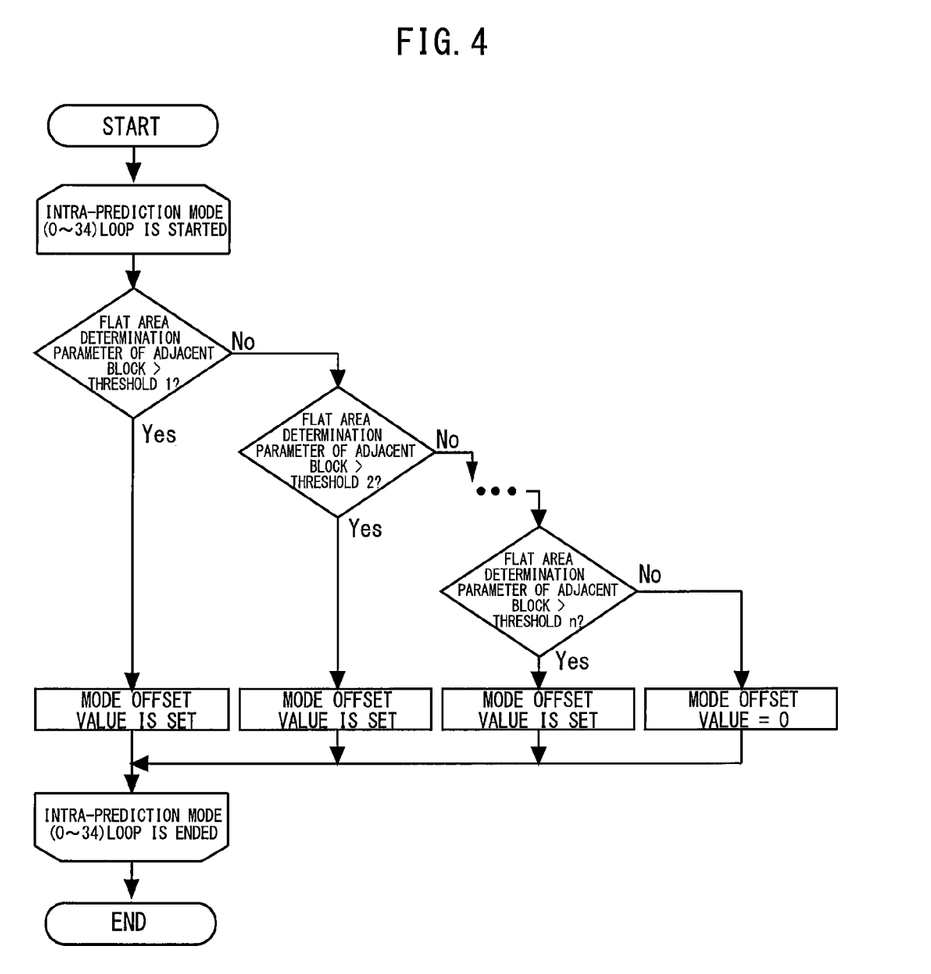
FIG. 4 is a diagram showing an intra-prediction mode offset value calculation flow.
Figure 5:
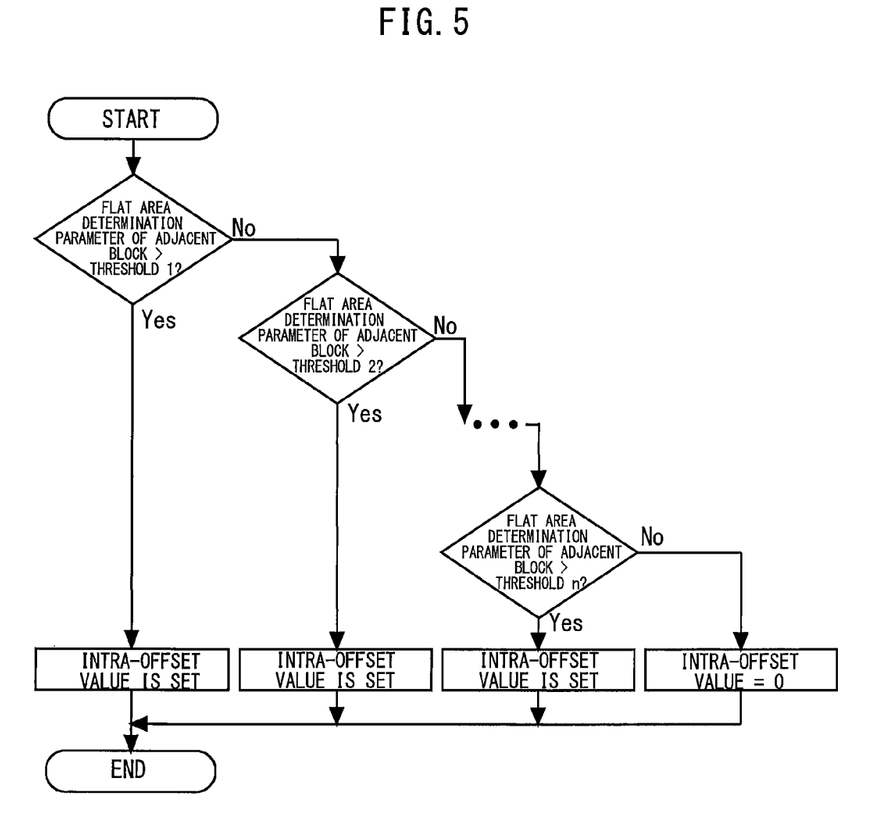
FIG. 5 is a diagram showing an intra-offset value calculation flow.

FIG. 4 is a diagram showing an intra-prediction mode offset value calculation flow. FIG. 5 is a diagram showing an intra-offset value calculation flow. In FIGS. 4 and 5, the multiple thresholds 1 to n are set, and the offset values different according to the thresholds are set. In the intra-prediction mode offset value calculation, the adjacent block used for intra-prediction is changed. Consequently, the offset value is set with respect to each intra-prediction mode.

The intra-prediction modes allow prediction in 35 different directions. Prediction based on the block similar to the coding target block reduces the error, thereby improving the encoding efficiency. Specifically, in a motionless area with flat pixel values, such as of a black border, degradation in image quality is subjectively prominent even if the difference of pixel values is small. Thus, the calculated offset value is added to the existing evaluation value, thereby facilitating selection of prediction from the similar block.

Figure 6:
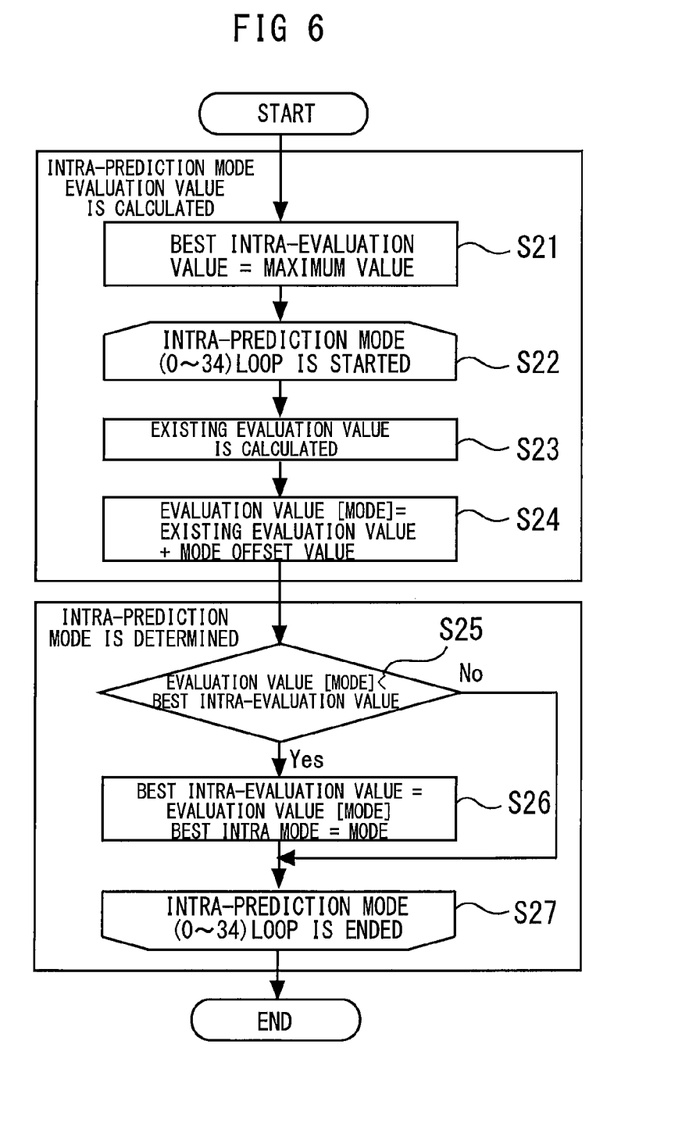
FIG. 6 is a diagram showing an intra-prediction mode determination flow.

FIG. 6 is a diagram showing an intra-prediction mode determination flow. First, the maximum value is set into the best intra-evaluation value (step S21). Next, the loop of the intra-prediction modes (0 to 34) is started (step S22). Next, the existing evaluation value is calculated (step S23). The existing evaluation value is calculated by the following Math. 3.

$$\text{Existing evaluation value} = D + \lambda * H \qquad \text{Math. 3}$$

Here, D indicates the error between the input image and the prediction image, $\lambda$ indicates a weighting coefficient, and H indicates header cost required during prediction. It is represented that the lower the evaluation value is, the smaller the amount of data is or the smaller the error from the input image and the better the encoding efficiency the mode has. The existing evaluation value represented in Math. 3 is used as it is without reappraisal of this value, and the offset value is added, thereby allowing this embodiment to be easily executed.

Next, the mode offset value is added to the existing evaluation value to obtain the evaluation value (mode) (step S24). Next, it is determined whether the evaluation value (mode) is lower than the best intra-evaluation value or not (step S25). In the higher case, the best intra mode is not updated, and the next intra-prediction mode is evaluated. On the contrary, in the lower case, the best intra evaluation value is updated to the evaluation value (mode) (step S26), and the next intra-prediction mode is evaluated. After evaluation of all the intra-prediction modes is completed, the loop of the intra-prediction modes (0 to 34) is finished (step S27).

Such use of the offset value calculated for every prediction mode allows the appropriate prediction mode to be selected. For example, in a case where the coding target block is in contact with the boundary of the black border at a lower part of the screen in windowboxing video having upper and lower black borders, the larger the flat area determination parameter of the upper adjacent block is, the larger the offset value of the prediction mode in the upward direction is, thereby making the intra-prediction in the upward direction resistant to being selected. Thus, in a case where the black border part is encoded, the prediction is performed on the basis of the black border part. Consequently, the prediction residual becomes small, thereby improving the intra-block image quality.

For the P-picture and B-picture, the offset is added to the evaluation value so that the precedence can be given to the inter-prediction with respect to the intra-prediction in motionless areas with flat pixel values, such as of black borders. Typically, in the flat areas, the degradation of the reference image used for inter-prediction is low, and the prediction error tends to be low. Furthermore, in the inter-prediction in the areas with flat pixel values, the motion vector is small. Accordingly, the amount of encoding is small. Consequently, it is appropriate to give precedence to the inter-prediction.

Figure 7:
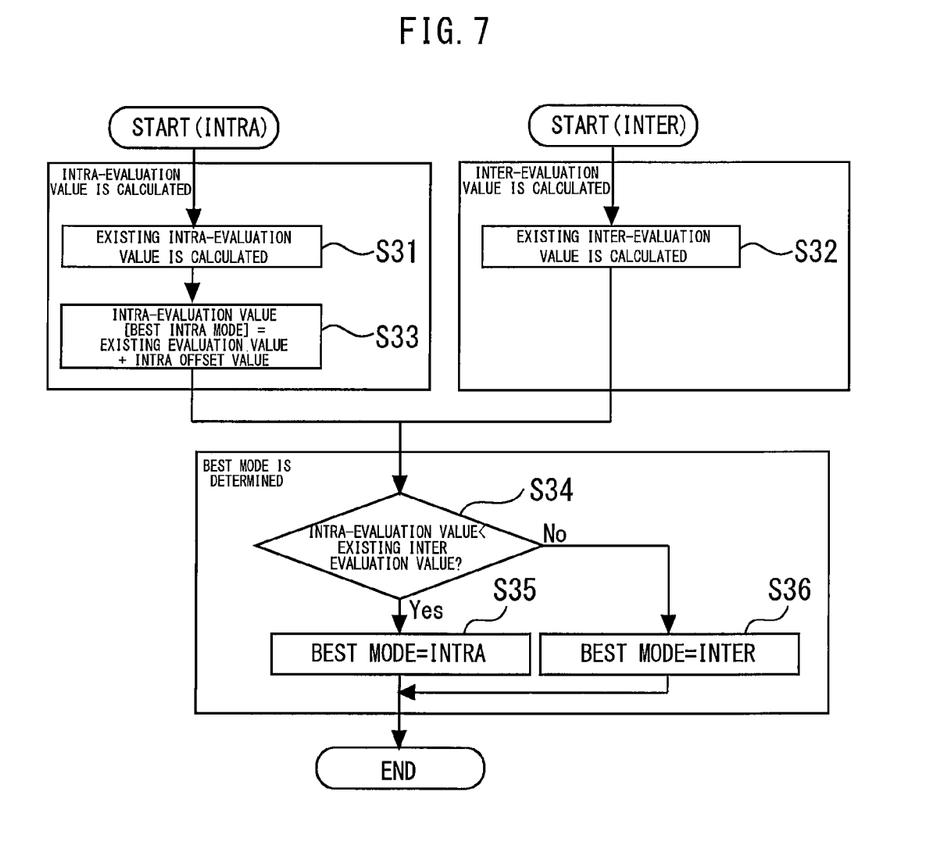
FIG. 7 is a diagram showing the intra/inter determination flow.

FIG. 7 is a diagram showing the intra/inter determination flow. First, the existing intra-evaluation value and the existing inter-evaluation value are calculated (steps S31 and S32). Next, the intra-evaluation value is obtained by adding the intra-offset value to the existing intra-evaluation value (step S33). Next, it is determined whether the intra-evaluation value is lower than the existing inter-evaluation value or not (step S34). In a case where the intra-evaluation value is lower, the best mode is determined to be the intra-mode (step S35). In the other case, the best mode is determined to be the inter-mode (step S36). Thus, in this embodiment, a process of adding the offset value to the existing intra-evaluation value used for intra/inter determination is added.

In the intra/inter determination, what has the lower evaluation value is selected. When the intra-offset value is set to a positive value, the intra-evaluation value becomes large, which makes the intra resistant to being selected. On the contrary, when the intra-offset value is set to a negative value, the intra tends to be selected. When the block with degraded image quality is the intra, setting the intra-offset value to a positive value makes the intra with a large prediction error more resistant to being selected. Selection with the precedence being given to the inter-prediction can improve the image quality. When the intra-block is selected in the intra/inter determination, improvement in image quality has already been achieved in the intra-prediction.

Figure 8:
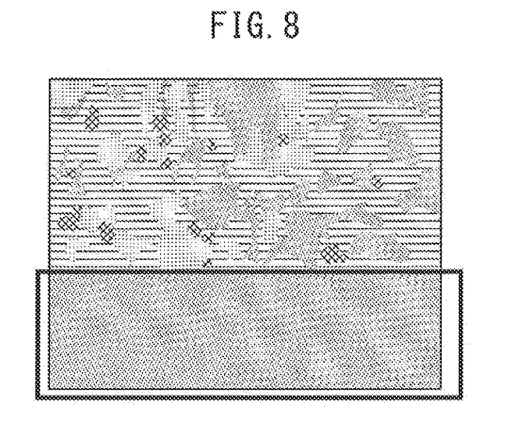
FIG. 8 is a diagram showing an example of video (input image).
Figure 9:
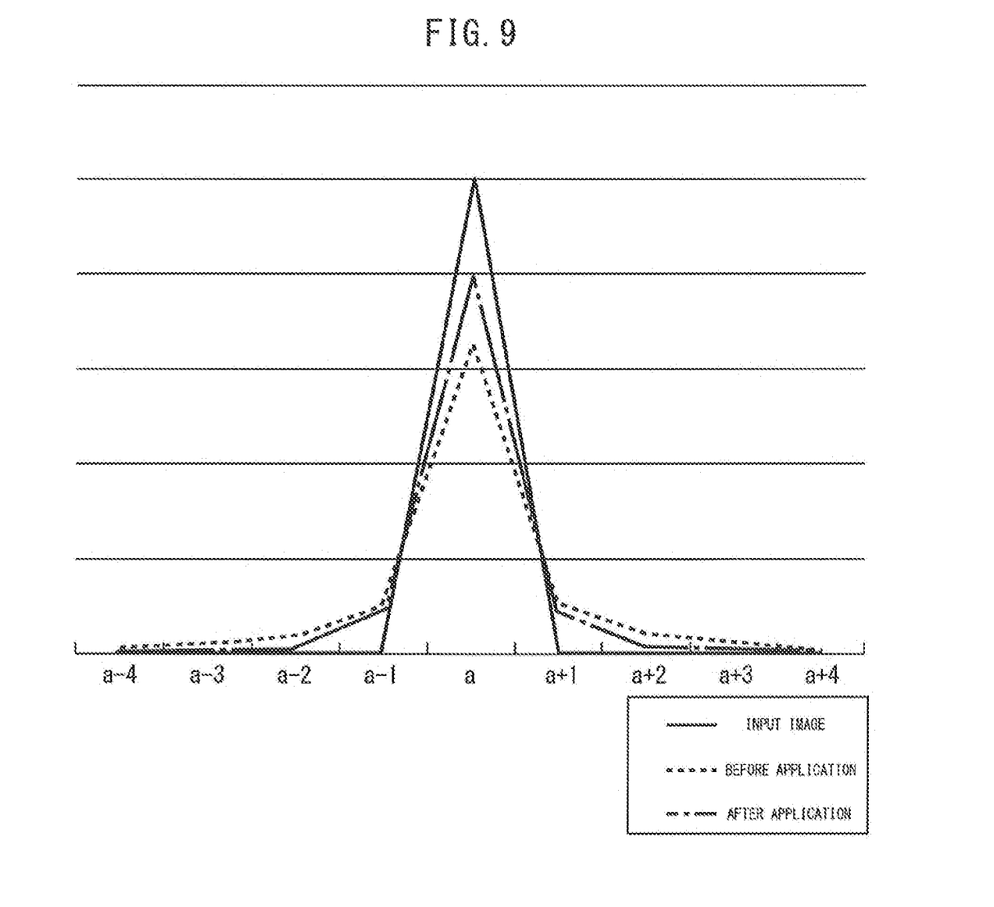
FIG. 9 is a diagram showing the frequency distribution of differences from pixel values after encoding with the pixel value of the input image being "a" with respect to a flat part encircled by a rectangle in FIG. 8.

FIG. 8 is a diagram showing an example of video (input image). FIG. 9 is a diagram showing the frequency distribution of differences from pixel values after encoding with the pixel value of the input image being "a" with respect to a flat part encircled by a rectangle in FIG. 8. In comparison between the frequency distributions before and after application of this embodiment, the distribution after application has more pixel values close to "a". Typically, the image quality where the pixel values after encoding are closer to the pixel values of the input image can be considered as image quality with low degradation. Consequently, application of this embodiment confirms that the image has pixel values close to those of input image and has lower degradation.

REFERENCE SIGNS LIST 1 computation unit, 2 orthogonal transformation unit, 3 quantization unit, 4 encoding unit, 11 prediction mode determination unit

What is claimed is:

1. A moving image encoding device generating a predictive image by using intra-prediction and encoding a difference between an input image and the predictive image for each block, comprising:
   a flat area determination parameter calculator configured to evaluate a flatness of each block of the input image to calculate a flat area determination parameter;
   an intra-prediction mode offset value calculator configured to calculate an intra-prediction mode offset value from the flat area determination parameter of an adjacent block used in the intra-prediction for each of a plurality of intra-prediction modes;
   an evaluation value calculator configured to calculate an evaluation value from the difference between the input image and the predictive image for each of the plurality of intra-prediction modes; and
   prediction mode determination circuity circuitry configured to select an optimal intra-prediction mode from the plurality of intra-prediction modes, based on a sum of the evaluation value and the intra-prediction mode offset value.

2. The moving image encoding device according to claim 1, further comprising application area limiting circuitry configured to substitute zero into the intra-prediction mode offset value used in the prediction mode determination circuitry when the flat area determination parameter of a coding target block is equal to or larger than a threshold.

3. A moving image encoding device generating a predictive image by using intra-prediction or inter-prediction and encoding a difference between an input image and the predictive image for each block, comprising:
   a flat area determination parameter calculator configured to evaluate a flatness of each block of the input image to calculate a flat area determination parameter;
   an evaluation value calculator configured to calculate an inter evaluation value and an intra evaluation value from the difference between the input image and the predictive image;
   intra-offset value setting circuity configured to set a larger intra-offset value as the flat area determination parameter of an adjacent block used in the intra-prediction is larger based on a comparison from a plurality of thresholds; and
   prediction mode determination circuitry configured to determine a prediction mode based on a magnitude of the inter evaluation value and a sum of the intra evaluation value and the intra-offset value.

4. The moving image encoding device according to claim 3, further comprising an application area limiting circuity configured to substitute zero into the intra-offset value used in the prediction mode determination circuitry when the flat area determination parameter of a coding target block is equal to or smaller than a threshold.

* * * * *